United States Patent [19]
Banjanin et al.

[11] Patent Number: 5,845,004
[45] Date of Patent: Dec. 1, 1998

[54] METHOD AND APPARATUS FOR PERFORMING FRAME INTERPOLATION IN AN ULTRASOUND IMAGING SYSTEM

[75] Inventors: Zoran Banjanin, Newcastle; King-Yuen Wong, Issaquah; Robert N. Phelps, Issaquah; Jin Kim, Issaquah; Jeffrey T. Reeve, Issaquah; Scott D. Otterson, Seattle, all of Wash.

[73] Assignee: Siemens Medical Systems, Inc., Iselin, N.J.

[21] Appl. No.: 673,228

[22] Filed: Jun. 28, 1996

[51] Int. Cl.⁶ .................................................. G06K 9/36
[52] U.S. Cl. ........................ 382/128; 382/128; 382/300; 604/22
[58] Field of Search ............................ 382/300; 358/428, 358/525; 128/662.06, 661.01, 660.07

[56] References Cited

U.S. PATENT DOCUMENTS

| | | | |
|---|---|---|---|
| 5,429,137 | 7/1995 | Phelps et al. | 128/661.09 |
| 5,515,457 | 5/1996 | Osano | 382/300 |
| 5,524,629 | 6/1996 | Mahony | 128/661.08 |
| 5,531,224 | 7/1996 | Ellis et al. | 128/660.07 |
| 5,535,748 | 7/1996 | Byrne et al. | 128/660.07 |
| 5,538,004 | 7/1996 | Bamber | 128/662.06 |
| 5,579,418 | 11/1996 | Williams et al. | 382/300 |

*Primary Examiner*—Leo H. Boudreau
*Assistant Examiner*—Kanji Patel

[57] ABSTRACT

An ultrasound system produces composite color flow images of tissue samples. To reduce image flicker, the ultrasound system stores the data required to produce two sequential color flow images and computes a series of interpolated images that are displayed between the actual color flow images. A piece-wise interpolation function is used to create the interpolated images in order to prevent artificial smoothing of the image data. In addition, the ultrasound system quantizes the ultrasound data used to compute the interpolated images in order to reduce the amount of memory required to store the data for the sequential color flow images.

22 Claims, 8 Drawing Sheets

METHOD AND APPARATUS FOR PERFORMING FRAME INTERPOLATION IN AN ULTRASOUND IMAGING SYSTEM

FIELD OF THE INVENTION

The present invention relates to ultrasound systems in general, and in particular to ultrasound systems having reduced image flicker.

BACKGROUND OF THE INVENTION

Ultrasound is an increasingly used technique for noninvasively examining a patient's body. In addition to its use for providing real time images of internal body matter (organs, for example), ultrasound is also useful for analyzing movement of internal body matter such as blood flow.

An ultrasound system works by transmitting high-frequency acoustic signals into the body and detecting and analyzing the return echoes. For imaging purposes, the strength and timing of the received signals are analyzed and used to generate a two-dimensional image on a monitor. To analyze moving matter, the frequency shift of the reflected ultrasound signal due to the Doppler effect is measured. A composite color flow image is typically produced whereby the stationary body matter is shown in black and white and the moving body matter is shown in a color that is dependent on its velocity.

The time required to create a composite color flow image of a tissue sample is referred to as the acoustic rate of the ultrasound system. Typical acoustic rates vary between 5 and 15 Hz. In conventional ultrasound systems, the composite color flow image is displayed on the monitor as soon as the image is complete. The image remains on the monitor until the next color flow image is complete, at which time the old image is overwritten with the new image. Because of the low acoustic rate of most ultrasound systems, the images presented to the physician or ultrasound technician flicker in a manner that is distracting. In addition, the velocity of a particle in the body may appear to change discontinuously as a new image is displayed.

SUMMARY OF THE INVENTION

The present invention is an ultrasound system that produces color flow images with reduced frame or image flicker without increasing the acoustic rate by displaying a series of interpolated images between actual color flow images. Each interpolated image simulates how the tissue represented by individual pixels of an actual color flow image changes between the successive color flow images. To produce the interpolated images, a memory in the ultrasound system stores the data required to produce the actual K–$1^{st}$ and K$^{th}$ images. Data from the K–$1^{st}$ image and K$^{th}$ image are combined in the ultrasound system using a piece-wise interpolation function to calculate the data used to display the interpolated images.

The presently preferred embodiment of the invention provides m bits of gray scale data, n bits of velocity data, j bits of power data and 1 bits of variance data in response to a received echo. To avoid having to store (m+n+j+1) bits for each pixel in the actual color flow images, the present invention only stores (m+n+k) bits comprising the m gray scale and n velocity data plus a combination of the power and variance data. By quantizing the data, the memory requirements of the ultrasound system are reduced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As indicated above, the present invention is an ultrasound system that creates and displays a series of interpolated color flow images between actual color flow images in order to reduce image flicker and to give the impression that the velocity of flow in the body changes smoothly.

Figure 1:
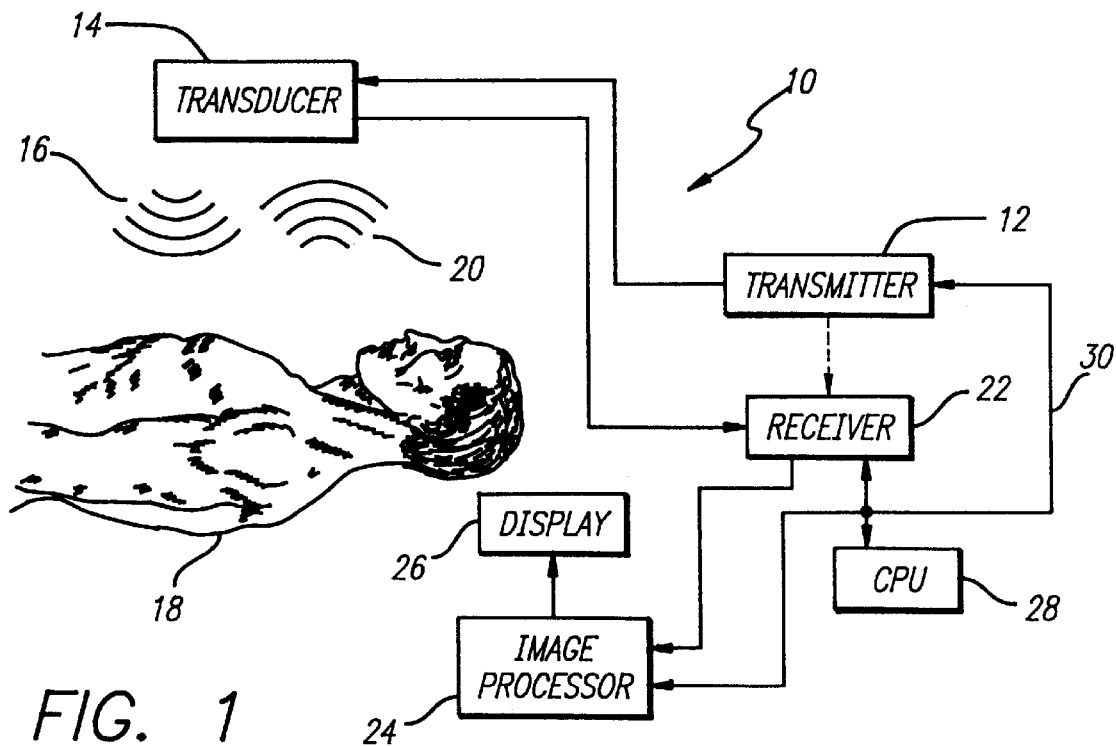
FIG. 1 is a simplified block diagram of an ultrasound system according to the present invention.

Referring now to FIG. 1, an ultrasound system 10 according to the present invention includes a transmitter 12 that generates electronic driving signals that preferably have a frequency between 2 and 10 MHz. The driving signals from the transmitter are coupled to an ultrasonic transducer 14 that typically comprises one or more piezoelectric crystals. The application of the driving signals to the piezoelectric crystals causes them to vibrate and produce ultrasonic waves 16 that are transmitted into a body 18 of a patient. The internal structure of the patient's body creates a reflected ultrasonic echo 20 that is received by the transducer and converted to a corresponding electrical signal fed to a receiver 22. The receiver digitizes and conditions the echo signals and delivers them to an image processor 24 that in turn produces a two-dimensional color flow image on a display monitor 26. From the display, a physician or ultrasound technician is able to view the internal structure as well as movement of flow within the patient's body.

The operation of the ultrasound system 10 is controlled by a central processing unit (CPU) 28 running a suitable computer program stored in a memory circuit. The CPU is connected to the transmitter 12, receiver 22 and image processor by a common data bus 30.

In addition to the major components described above, the ultrasound system may include different OEM devices such as videotape recorders for storing a record of the color flow image, a black-and-white or color printer, or one or more disk drives for storing records of the reflected ultrasound signals. The ultrasound system may also include a communication link such as a modem, ethernet card, etc., for transmitting the ultrasound signals to a remote location. The details of the ultrasound system 10 are considered to be well known to those of ordinary skill in the art and need not be considered further except as they relate to the image interpolation aspect of the present invention.

Figure 2:
FIG. 2 illustrates a composite, color flow image.

FIG. 2 shows an example of a color flow image 50. The color flow image contains black and white areas 52 that represent the stationary matter in the tissue under examination. The intensity or brightness of the stationary matter is a function of the strength of the return echo from a corresponding point in the tissue.

In addition to the image of the stationary tissue, the color flow image also shows colored areas that represent moving matter, such as blood flow. For example, an artery may be shown in colored areas 54 and 56 whereby the color of the moving blood is dependent on its velocity.

To produce a composite color flow image, the ultrasound system transmits a series of ultrasonic pulses into the patient and monitors the strength of the received echo. The image of the stationary matter is constructed as a series of pixel columns, each of which may include one thousand or more pixels. The brightness of each pixel is determined by the strength of the received echo signals from a corresponding point in the tissue. Typically, there are 100 to 500 vertical columns of pixels in a standard color flow image.

After the stationary body matter has been imaged, the ultrasound system detects the moving flow. To do this, the ultrasound system transmits another series of ultrasonic pulses into the patient and detects the returned echoes. Each point in the tissue may be sampled with ten or more ultrasonic pulses in order to obtain sufficient data to determine if the point is moving. The Doppler shift of the echoes is determined and converted to a velocity that is displayed in color in the color flow image.

As will be appreciated, the acoustic rate or time to construct a single color flow image 50 of the type shown in FIG. 2 is considerable due to the amount of data that needs to be obtained.

As described above, conventional ultrasound systems complete a color flow image and display the image on a video monitor until the next image is complete. Due to the relatively low acoustic rate, the images presented to the user appear discontinuous and may interfere with the proper diagnosis of the tissue under examination.

Figure 3:
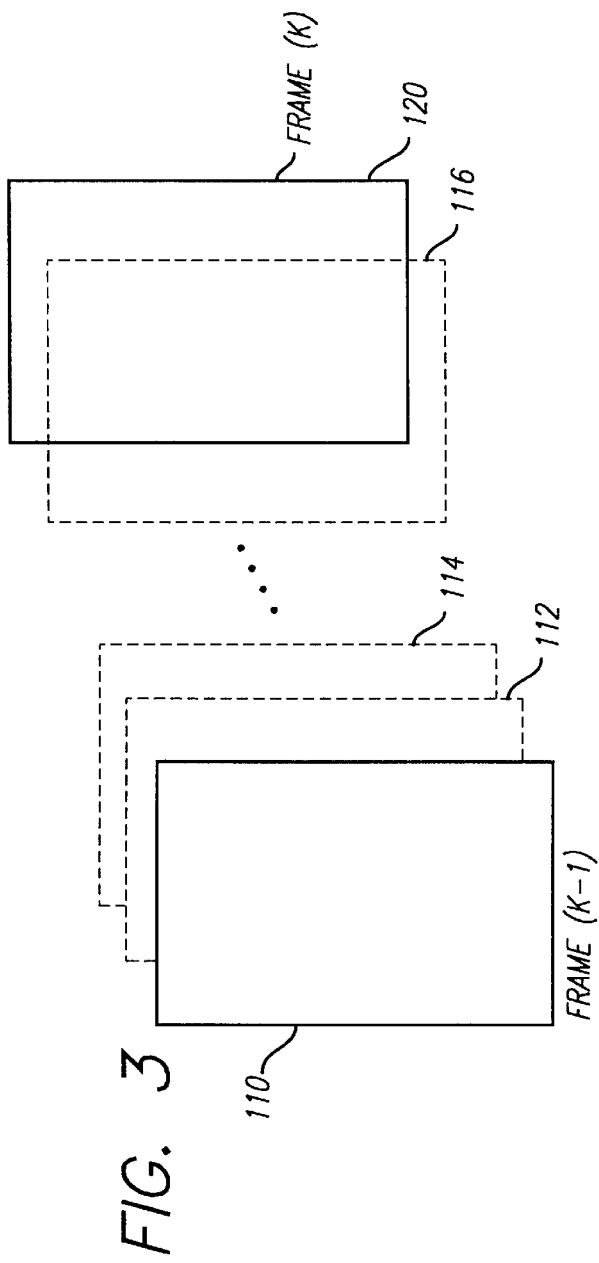
FIG. 3 shows a series of interpolated images created by the ultrasound system of the present invention to reduce image flicker.

To solve the problem of image flicker associated with the low acoustic rate, the ultrasound system of the present invention creates a series of intermediate, interpolated color flow images that are rapidly displayed between the actual color flow images created from the echoes received from the ultrasound system. As shown in FIG. 3, the data required to produce the actual $K-1^{st}$ image 110 created by the ultrasound system is collected and stored in a digital memory within the image processor before the $K-1^{st}$ image is displayed. The data required to produce the $K^{th}$ image is also collected and stored in memory before the $K^{th}$ image is displayed. After the data for the $K-1^{st}$ and $K^{th}$ images have been stored in memory, the $K-1^{st}$ image 110 is displayed. Next, the data stored for the $K-1^{st}$ image and the data for the $K^{th}$ image is read from memory and an interpolated image 112 is computed from the data and displayed. Subsequent interpolated images 112, 114, 116, . . . are computed and displayed. This process continues until the next actual color flow image 120 is displayed. The interpolated images 112, 114 . . . 116 approximate how the reflectors represented by individual pixels vary from the $K-1^{st}$ image to the $K^{th}$ image.

In order to provide a flicker-free display, the interpolated images are displayed in sync with the vertical sync signal of the video monitor. The vertical sync signal refreshes the display at a fixed rate that is generally between 48 and 80 Hz. The acoustic rate at which the ultrasound system produces the actual color flow images is not constant but varies with a number of factors such as the depth of the tissue to be imaged, the pulse repetition frequency of the ultrasonic signals used to image the tissue, the number of beam lines in the image, etc. In general, the video sync rate will not be an even multiple of the acoustic rate; therefore, the present invention may vary the number of interpolated images that are shown between the actual color flow images.

Figure 4:
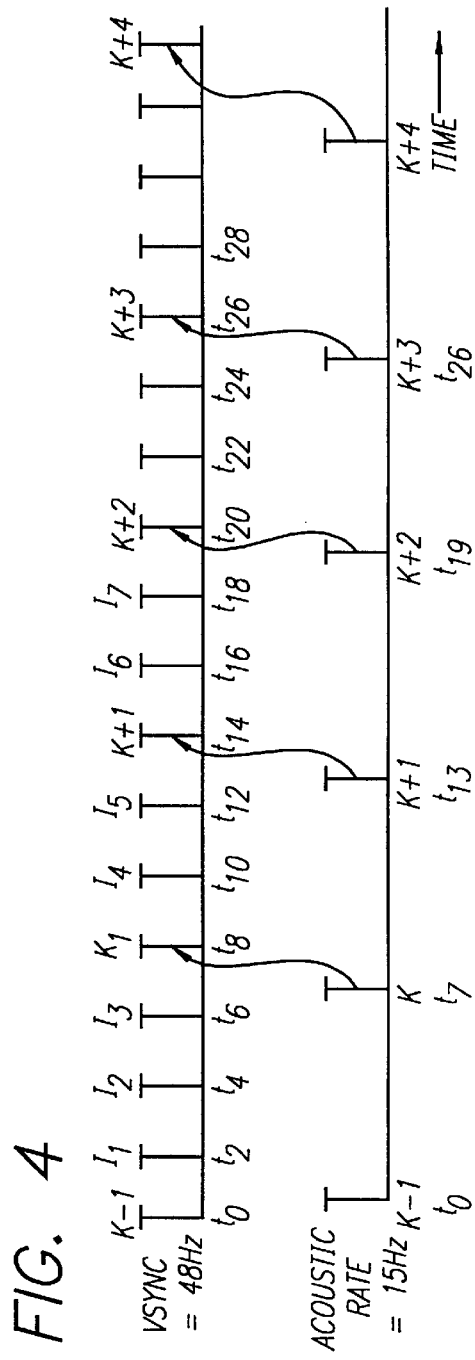
FIG. 4 is a timing diagram that illustrates how the present invention synchronizes the interpolated images with a video sync signal.

FIG. 4 illustrates how the interpolated images are synchronized with the vertical sync signal to produce a relatively flicker-free video display. In the example shown, the vertical sync signal has a frequency of 48 Hz and therefore refreshes the video display every 20.83 msecs. The acoustic rate of the ultrasound system is 15 Hz, which is not an even divider of the video sync rate. Therefore, the number of interpolated images that are produced between the actual color flow images will vary over time.

As described above, once the data required to produce both the $K-1^{st}$ and $K^{th}$ images has been stored in memory, the $K-1^{st}$ image is displayed simultaneously with a vertical sync pulse that occurs at a time $t_0$. Simultaneously with the next occurrence of the vertical sync pulse that occurs at time $t_2$, the first interpolated image $I_1$ is displayed. The image $I_1$ represents the way in which the body matter or flow changes between the $K-1^{st}$ image and the $K^{th}$ image. At the next occurrence of the video sync pulse at time $t_4$, the next interpolated image $I_2$ is displayed. Similarly, the third interpolated image $I_3$ is displayed at a time $t_6$. A time $t_7$ reflects one period of the acoustic rate; however, because this does not align with the vertical sync rate, the $K^{th}$ image is delayed until the next occurrence of the vertical sync pulse at time $t_8$. As can be seen, there are three interpolated images $I_1$, $I_2$, and $I_3$ that are displayed between the $K-1^{st}$ and $K^{th}$ images. Due to the relative frequencies of the vertical sync rate and the acoustic rate, it is only necessary to display two interpolated images $I_4$ at time $t_{10}$ and $I_5$ at time $t_{12}$ between the $K^{th}$ and $K+1^{st}$ images.

The next period of the acoustic rate ends at time $t_{13}$ when the $K+1^{st}$ image can be displayed. Again, because time $t_{13}$ does not align with one of the vertical sync pulses, the $K+1^{st}$ image is not displayed until the next occurrence of the vertical sync pulse that occurs at time $t_{14}$. Two interpolated images $I_6$ and $I_7$ are displayed at times $t_{16}$ and $t_{18}$ between the $K+1^{st}$ and the $K+2^{nd}$ images. This process continues whereby the ultrasound system displays two or three interpolated images between the actual color flow images created in response to the received ultrasound echoes. The next time the acoustic rate aligns with the vertical sync rate is at time $t_{26}$ when the $K+3^{rd}$ image is displayed simultaneously with a vertical sync pulse and the cycle repeats.

As can be seen, the number of interpolated images that are displayed between actual color flow images depends on the relative frequency of the vertical sync rate and the acoustic rate. There are three ways in which a varied number of interpolated images can be displayed. First, the interpolation coefficients used to create the images can be modified depending on the number of images to be produced. That is, the interpolation functions can be modified depending on whether there are two or three interpolated images to be produced. Secondly, the interpolation functions can remain fixed (i.e., to produce two interpolated images) and one or more interpolated images may be shown twice. In the example shown above, the image $I_7$ may be the same as the $I_6$ image. Finally, if the system usually displays three interpolated images between actual color flow images and then only two interpolated images are required, all three can be computed and the last one is simply not displayed. Because the images are displayed at the relatively fast vertical sync rate, the user does not detect significant image flicker by repeating or omitting an image.

Figure 5:
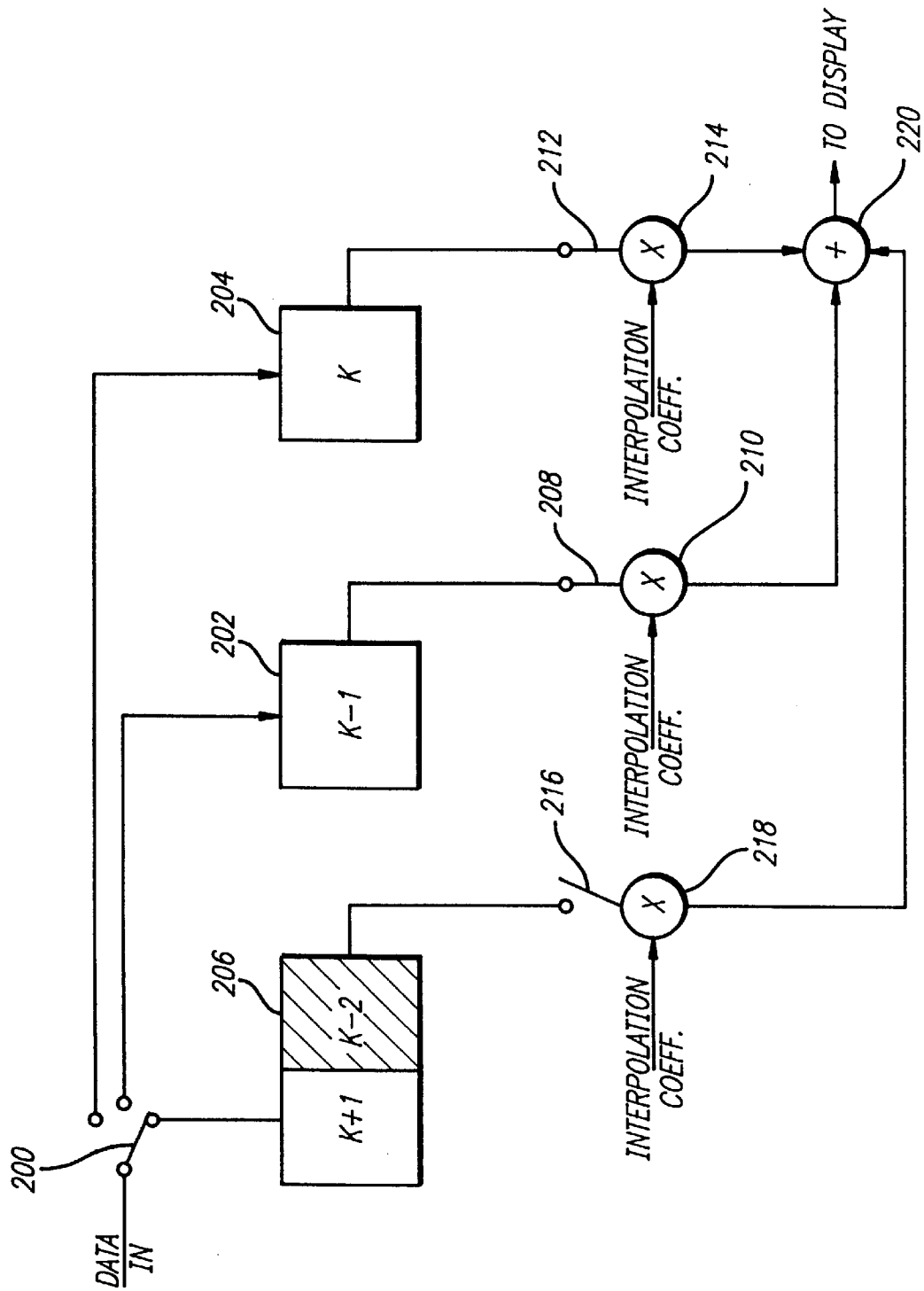
FIG. 5 is a block diagram showing how the ultrasound system of the present invention stores ultrasound data in a plurality of digital memories in order to create the interpolated images.

FIG. 5 illustrates how the memory of the ultrasound system is used to create the interpolated images. Ultrasound data produced in response to the received echoes is fed through a switch 200 that routes the data to one of three digital memories 202, 204 and 206 (or a single partitioned memory). Once the memory is filled with sufficient data to produce a color flow image, the position of the switch 200 is moved and the next memory is overwritten with data required to produce the next image. In the example shown, the data required to produce the $K-1^{st}$ image is stored in memory 202 while the data required to produce the $K^{th}$ image is stored in the memory 204. Data required to produce the $K+1^{st}$ image overwrites the data used to produce the $K-2^{nd}$ image in memory 206.

A switch 208 is positioned between the memory 202 and a multiplier 210. A switch 212 is positioned between the memory 204 and a multiplier 214 while a switch 216 is positioned between the memory 206 and a multiplier 218. When the switches are closed, data from the memories is read and applied to the multipliers. The outputs of the multipliers are summed at an adder 220.

To produce the interpolated images, two of the switches are closed and data is read from the memories and scaled by an interpolation coefficient in a multiplier. For example, to create the interpolated images between the $K-1^{st}$ and $K^{th}$ images, the switches 208 and 212 are closed and switch 216 is opened. Data read from the memories is scaled by an interpolation coefficient in each of the multipliers 210, 214. The outputs of the multipliers are summed in the adder 220.

To create the interpolated images between the $K^{th}$ image and the $K+1^{st}$ image, switch 208 is opened and switch 216 is closed. The position of switch 200 is changed and data from the ultrasound system is routed to the memory 202 to overwrite the data used to produce the $K-1^{st}$ image.

Although the presently preferred embodiment of the invention stores the data for two successive flow images, it will be appreciated that data for additional images could be stored and used for interpolation, if desired.

Figure 6A:
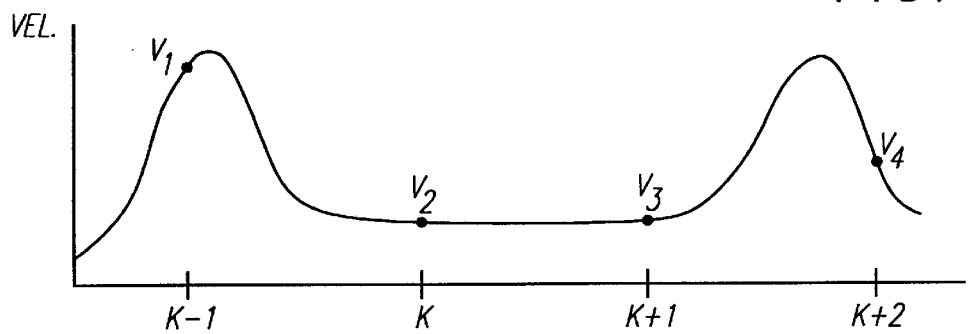
FIGS. 6A–6D are graphs illustrating how the interpolated images differ when created with different interpolation functions.

A typical velocity profile of a particle in the body that is exposed to blood flow is shown in FIG. 6A. When the $K-1^{st}$ image is produced by the ultrasound system, the particle in question has a velocity $V_1$ during the systole phase of the heartbeat. When the $K^{th}$ image is complete, the particle has a velocity $V_2$ that occurs during the diastole phase of the heartbeat. When the $K+1^{st}$ image is complete, the object has a velocity $V_3$ that is substantively equal to the velocity $V_2$. The particle has an increased velocity $V_4$ when the $K+2^{nd}$ image is completed during another systole phase of the heartbeat.

Figure 6B:
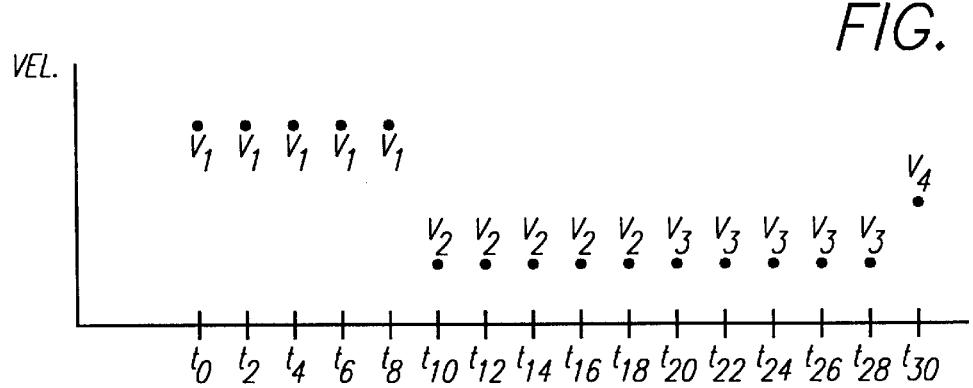

FIG. 6B illustrates how the velocity of the particle shown in FIG. 6A appears on the display if no interpolation is performed. At each refresh of the video monitor, the velocity of the particle remains the same until it changes when the next color flow image is complete. For example, at time $t_0$, the $K-1^{st}$ image is displayed wherein the particle has a velocity $V_1$. When the $K^{th}$ image is displayed at time $t_{10}$, the velocity of the particle rapidly changes to $V_2$. At each vertical sync signal occurring between times $t_0$ and $t_{10}$, the particle is shown having the same velocity $V_1$.

As will be appreciated, the abrupt velocity change from $V_1$ to $V_2$ that occurs between the times $t_8$ and $t_{10}$ with no interpolation causes flicker on the video display. These rapid changes in velocity appear unnatural to the user, particularly if the user is expecting that the velocity of the particle will vary smoothly over time.

Figure 6C:
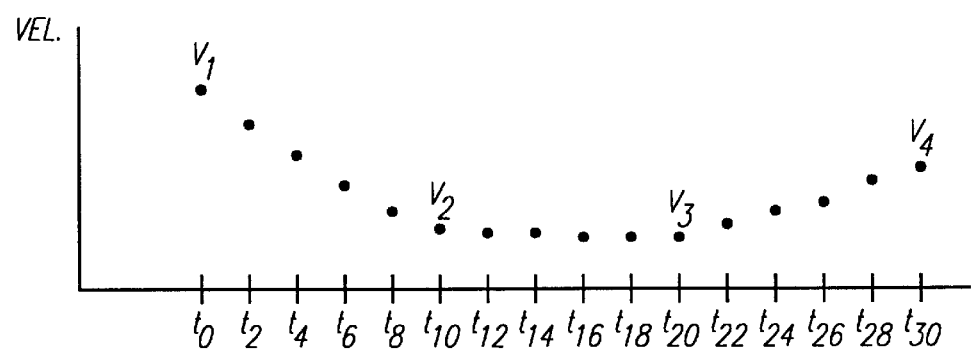
Figure 6D:
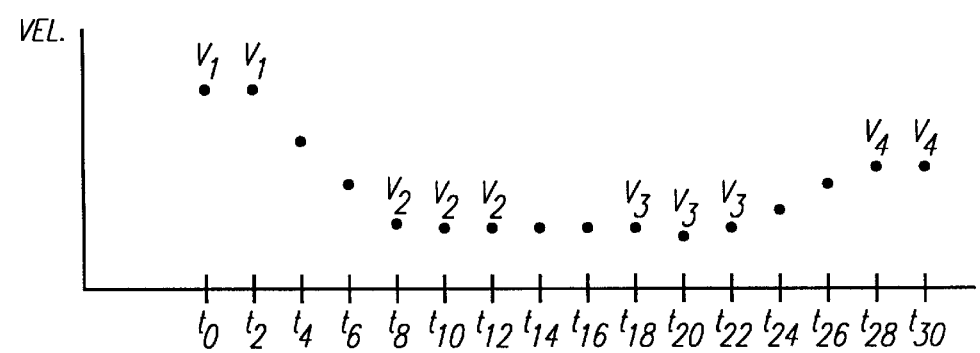
Figure 6E:
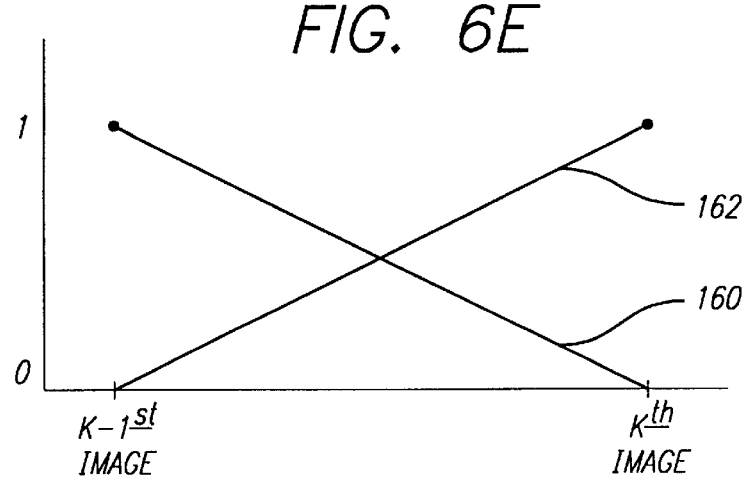
FIGS. 6E–6G are graphs illustrating three possible interpolation functions used to create the interpolated images.

FIG. 6C illustrates a smoothing effect that occurs when a bilinear interpolation function of the type shown in FIG. 6E is used to create a series of interpolated images between the actual color flow images.

An interpolation function that can be used to generate the interpolated images between the $K-1^{st}$ image and the $K^{th}$ image comprises two linear segments, the first of which is a segment 160 that extends from unity when the $K-1^{st}$ image is displayed to zero when the $K^{th}$ image is displayed. A second segment 162 extends from zero when the $K-1^{st}$ image is displayed to unity when the $K^{th}$ image is displayed. The segment 160 is used to weight the contribution of the data used to produce $K-1^{st}$ image while the segment 162 weights the data used to produce the $K^{th}$ image.

Returning now to FIG. 6C, when the interpolation function shown in FIG. 6E is used, the velocity of the particles shown in the interpolated images will vary smoothly between $V_1$, a time $t_0$ and $V_2$ shown at time $t_{10}$. However, by comparing the velocity profile in FIG. 6C with the actual profile shown in FIG. 6A, it will be appreciated that the velocity displayed in the interpolated images does not accurately reflect the true velocity of the particle in the tissue. Due to the interpolation, especially when the acoustic rate is very low compared to the video sync rate, the image presentation may look too smooth and the inherent pulsating nature of the flow may be lost.

Figure 6F:
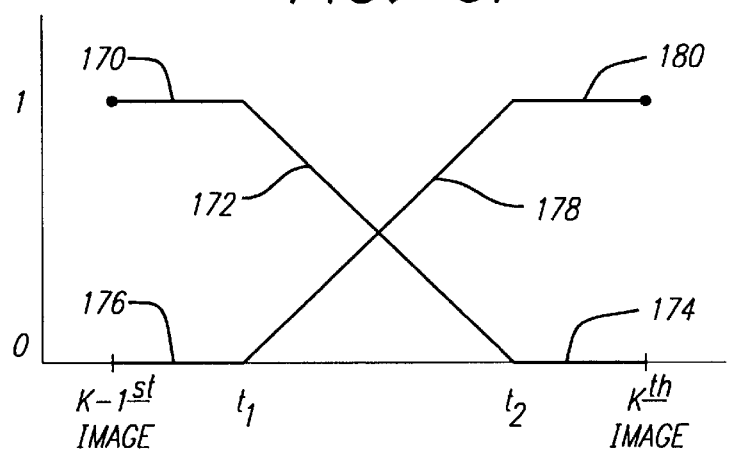
Figure 6G:
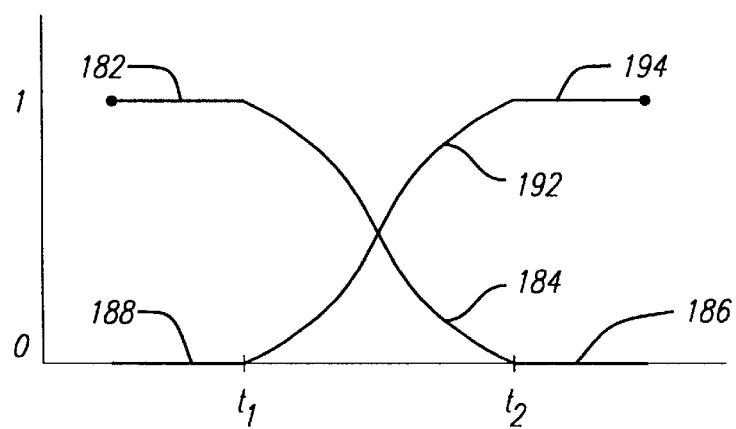

To improve upon the accuracy of the interpolated images, the present invention utilizes a hybrid interpolation function as shown in FIG. 6F. This function comprises two piecewise functions that are used to scale the data used to create the $K-1^{st}$ and $K^{th}$ images. The first piece-wise function comprises a segment 170 having a substantially unity value and a segment 174 having a substantially zero value. The segment 170 extends from the time the $K-1^{st}$ image is displayed up to a time $t_1$. The segment 174 begins at a time $t_2$ and continues until the time at which the $K^{th}$ image is displayed. A middle segment 172 connects the end of the segment 170 occurring at time $t_1$ and the beginning of the segment 174 occurring at time $t_2$. The middle segment is preferably linear but could have other smoothly varying shapes, such as sinusoidal (FIG. 6G), exponential, etc. Together the segments 170, 172 and 174 scale the data used to produce the $K-1^{st}$ image in order to produce the interpolated images. To scale the data used to create the $K^{th}$ image, a piece-wise function comprising segments 176, 178 and 180 is used. The segment 176 has a substantially zero value between the beginning $K-1^{st}$ image and time $t_1$. The segment 180 has a substantially unity value between times $t_2$ and the time at which the $K^{th}$ image is displayed. A sloping, middle segment 178 connects the segment 176 to the segment 180 between the times $t_1$ and $t_2$.

FIG. 6D shows the results obtained using the interpolation function shown in FIG. 6F. The velocity profile has a trapezoidal shape, wherein the velocity displayed at time $t_2$ remains the same as the velocity shown at time $t_0$. Similarly, the velocity shown at time $t_8$ is the same as the velocity shown at time $t_{10}$. However, between times $t_2$ and $t_8$, the velocity changes smoothly between $V_1$ and $V_2$. The trapezoidal velocity profile shown in FIG. 6D more accurately represents the true temporal velocity profile of the moving object in the tissue under examination. The duration of the flat portions of the interpolation functions shown in FIG. 6F can be optimized by the system given the ratio of the vertical sync rate and the acoustic rate. The goal is to produce images that preserve the pulsating nature of the flow without flicker. Preferably, both flat sections of the interpolation function should have the same duration and the middle, sloping section should not have an angle of less than 45°. By changing the duration of the flat portions, the system can preserve more or less of the pulsating nature of the flow in the interpolated images. However, it will be appreciated that some information will be lost due to the inherent acoustic undersampling and cannot be recovered by interpolation.

Figure 7A:
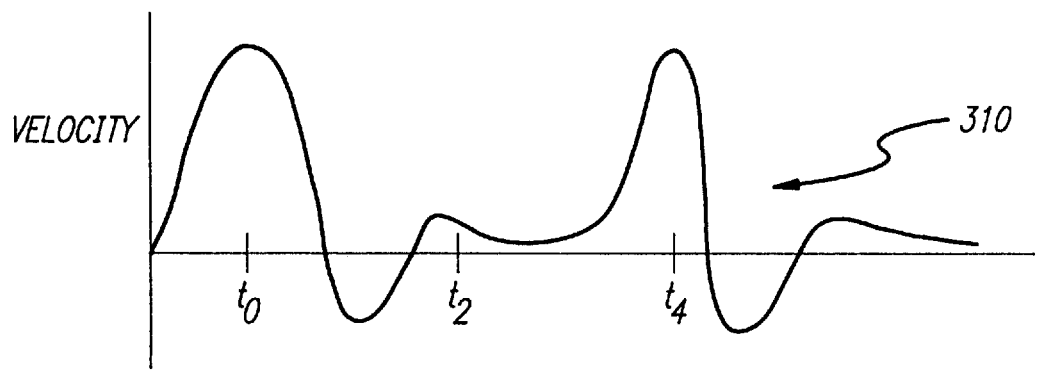
FIGS. 7A–7B are graphs illustrating an aliasing effect that occurs when the pulse repetition frequency of the ultrasound system is too slow to capture a quickly moving flow in the body.
Figure 7B:
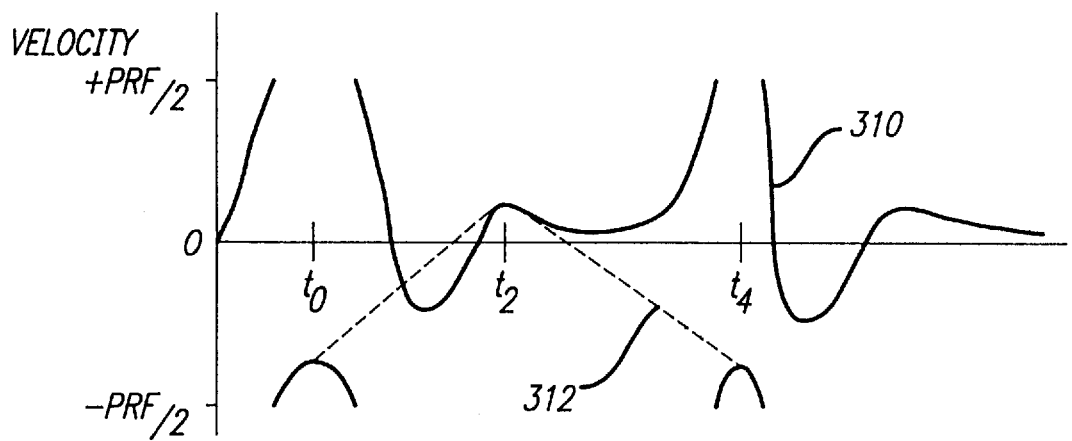

If the pulse repetition rate of the ultrasound system is too low, the ultrasound system cannot accurately image fast flow. FIG. 7A is another graph of a typical velocity profile 310 of a particle in the blood stream. The particle experiences sharp increases in velocity at times $t_0$, $t_4$ that occur at the systole of the heartbeat. FIG. 7B shows how the velocity profile is digitized if the pulse repetition frequency of the ultrasound system is too low. The peak velocities appear as negative numbers due to aliasing. If the interpolated images are created using the aliased data, the smoothing effect of the interpolation creates velocities that lie around the zero velocity region along a line 312 and do not reflect the true velocity of the particle. Therefore, in the present invention, the image processor monitors the ultrasound data on a pixel-to-pixel basis for aliasing and if aliasing is detected, then no interpolation is performed for the pixel or region of pixels with aliased data. Aliased data is generally recognized when a pixel corresponds to data having a positive velocity in one image and negative velocity in an immediately following image or vice versa. When aliased data is detected by the image processor, half of the interpolated images are displayed with the original positive (or negative) velocity and half are displayed with the negative (or positive) velocity.

As will be appreciated from the previous discussion, the amount of memory required to compute the interpolated images is substantial. Most ultrasound systems produce at least 8 bits of gray scale data, 8 bits of velocity data, 8 bits of power data and 8 bits of variance data that are used to produce the actual composite color flow images. However, more expensive, higher end systems have more bits for representation of the gray scale, velocity, power data, and variance data.

Figure 8A:
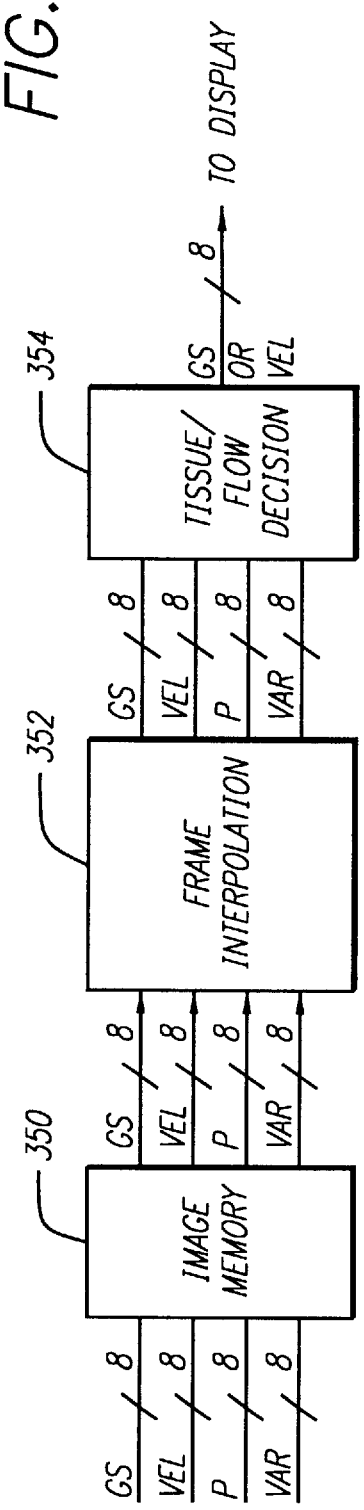
FIGS. 8A–8D are block diagrams illustrating alternative schemes for storing ultrasound data used to create the interpolated images.

FIG. 8A illustrates a straightforward method of storing the ultrasound data to produce the interpolated images. The typical ultrasound system provides 32 bits of data for each pixel to be produced in the color flow image. The 32 bits are stored in a memory that is partitioned to store the data for the $K-1^{st}$ and the $K^{th}$ images at a step represented by block 350. Once the data has been stored, the image processor performs an image interpolation at a step represented by block 352 that uses all 32 bits to produce each pixel in the interpolated image. All 32 bits of the interpolated pixel data are supplied to a post-image interpolation tissue flow decision represented at block 354, whereby the ultrasound system determines whether the tissue is stationary and will be displayed in black and white or is moving and will be displayed in color. The output of the tissue flow decision typically comprises 8 bits of gray scale data that control the brightness of the pixel in the display or 8 bits of velocity data that control the color of the pixel if the data indicates the particle is moving. Storing 32 bits of data for each pixel to be produced in the $K-1^{st}$ and $K^{th}$ image significantly increases the amount of memory required in the ultrasound system.

Figure 8B:
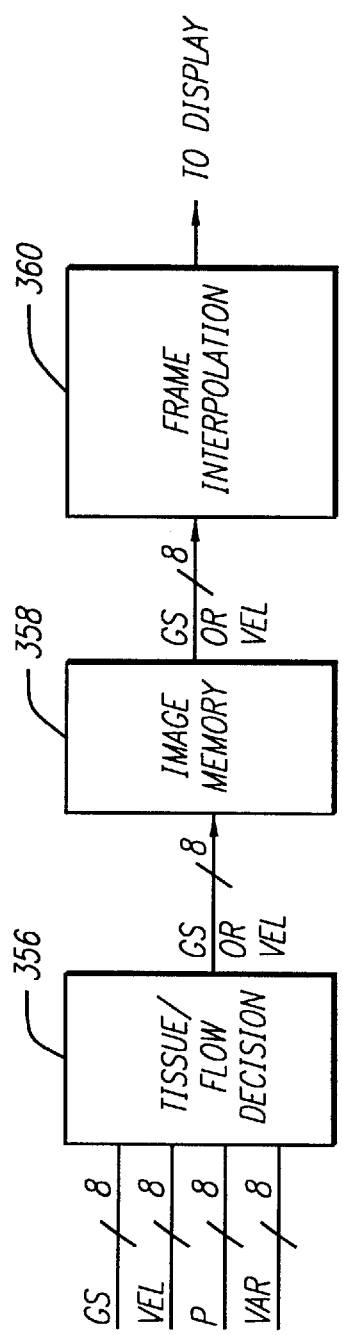

FIG. 8B shows an alternative to the scheme shown in FIG. 8A. In this example, the 32 bits of data provided by the ultrasound system are supplied to a tissue flow decision represented by block 356 that determines whether the reflector represented by the pixel is moving or stationary. Depending on whether the reflector is stationary or moving, 8 bits of gray scale or 8 bits of velocity data are stored in the image memory represented by block 358 for the $K-1^{st}$ and $K^{th}$ image. Once the memories are full, the image interpolation takes place at a step represented as block 360 and the interpolated images shown on the display.

The problem with the arrangement shown in FIG. 8B is that a reflector in the tissue may be stationary in the K-1image and moving in the $K^{th}$ image or vice versa. If the reflector is determined to be stationary in the $K-1^{st}$ image and the velocity data is thrown away and the reflector is subsequently moving in the $K^{th}$ image, there is no data remaining that can be used to interpolate the change in velocity. It is therefore advantageous to perform the tissue/ flow decision after the interpolation has been completed.

Figure 8C:
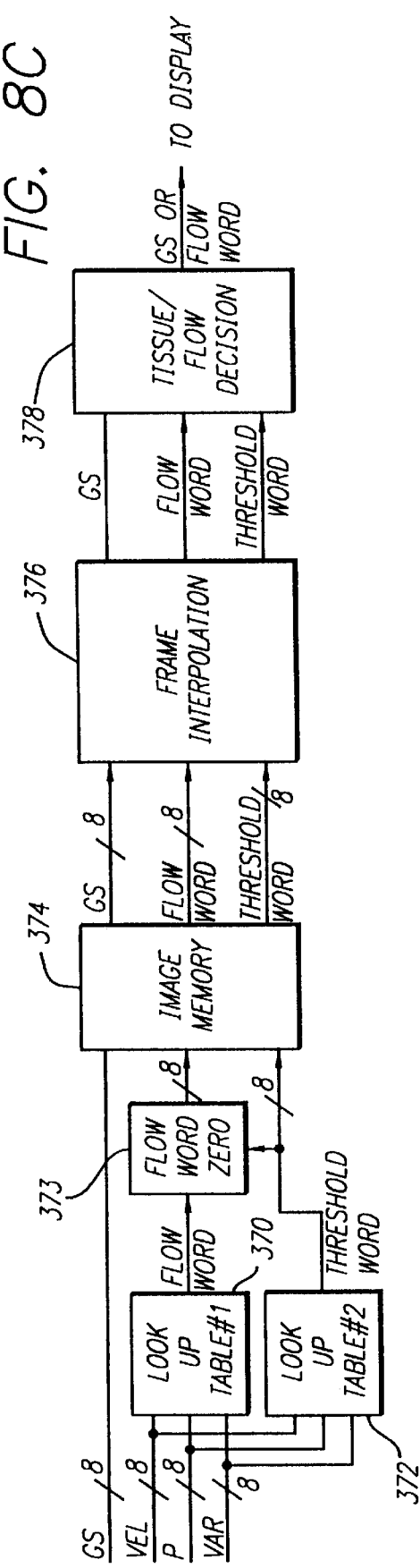

FIG. 8C shows a compromise between the methods shown in FIGS. 8A and 8B. In order to reduce the amount of data that must be stored for each pixel, a pair of lookup tables are used. A lookup table represented by block 370 receives 8 bits of velocity data, 8 bits of power data and 8 bits of variance data and produces an 8 bit flow word that is a linear or nonlinear combination of the input data. A second lookup table represented by block 372 receives the same 8 bits of velocity data, 8 bits of power data and 8 bits of variance data and produces a threshold word that is also a linear or nonlinear combination of the input data. The flow word represents data to be displayed in the image while the threshold word is used to determine if the corresponding reflector is stationary or moving. The flow and threshold words can be composed depending on the current display mode of the system. For example, if velocity and variance are displayed, the flow word can be comprised of 6 bits of velocity data and 6 bits of variance data. At the same time, the threshold word can be comprised of only 4 bits of power data. Alternatively, if velocity is displayed, the flow word could be all 8 bits of the velocity data and the threshold word could be a combination of 4 bits of power and 4 bits of variance data.

The flow word and threshold word are applied to a flow word zero step represented by block 373 that determines if the velocity data is inaccurate and, if so, reduces the data value to zero. The flow word, threshold word and 8 bits of gray scale data are stored in the memory represented at block 374 for each pixel to be produced in the $K-1^{st}$ and the subsequent $K^{th}$ image. The 24 bits of data are then interpolated as represented by block 376 to simulate how the tissue changes between the $K-1^{st}$ and $K^{th}$ images. The interpolated data is then applied to a tissue flow decision represented by block 378 that determines if the reflector represented by the pixel is stationary or moving and selects either the 8 bits of gray scale data or the 8 bit flow word to display on the video monitor. The advantage of using the system shown in FIG. 8C is that there is a 25 percent reduction in the amount of data that must be stored in the memory to produce the interpolated images.

Figure 8D:
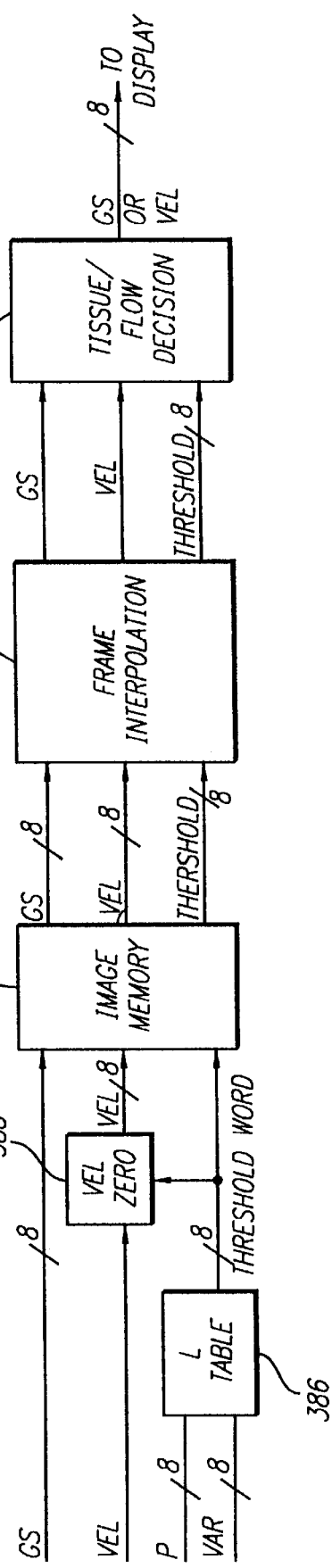

A more specific example of the system shown in FIG. 8C is shown in FIG. 8D. Here, a single lookup table represented by block 386 is used to compress the ultrasound data. The lookup table receives the 8 bits of power data and the 8 bits of variance data and produces a threshold word comprising 4 bits of power data and 4 bits of variance data by ignoring the four least significant bits of the power and variance data bytes. To determine if the velocity data is erroneous, the velocity data and threshold word are applied to a velocity zero block 388. The velocity zero block zeroes out the velocity data if the data appears erroneous. The threshold word, gray scale data, and velocity data are applied to the image memory at a step represented as block 390 to store the data for the K–1$^{st}$ and the subsequent K$^{th}$ image. The 24 bits of data are then interpolated at a step represented as block 392 which calculates the value of the data used to produce the intermediate images. The interpolated data is then applied to a tissue flow decision represented as block 394 whereby either the 8 bit gray scale or 8 bit velocity data is selected and shown on the display. Again, the advantage of the system shown in FIG. 8D is that only 24 bits of data need to be stored for each pixel to be displayed in the K–1$^{st}$ and K$^{th}$ image, thereby reducing the total memory requirement of the ultrasound system.

As can be seen, the present invention is an ultrasound system that provides color flow images without image flicker.

The embodiments of the invention in which an exclusive property or privilege is claimed are defined as follows:

1. A method of displaying color flow images in an ultrasound system, comprising the steps of:
   generating one or more driving signals;
   supplying the driving signals to a transducer that converts the driving signals into ultrasonic waves;
   directing the ultrasonic waves into a tissue sample under examination;
   detecting ultrasonic echoes reflected from the tissue sample, converting the ultrasonic echoes to received ultrasonic signals, and supplying the received ultrasonic signals to a receiver that produces data required to produce a color flow image;
   storing the data required to produce at least a first and a second color flow image in a memory circuit;
   determining a number of vertical sync signals that occur between the time when the data for the first and second color flow images are produced;
   interpolating the data stored for the first and second color flow image to produce one or more interpolated images; and
   displaying the first and second color flow images and a number of the one or more interpolated images at a vertical sync rate of the ultrasound system, wherein the number of interpolated images displayed is dependent on the number of vertical sync signals that occur between the time when the data for the first and second color flow images are produced.

2. The method of claim 1, wherein the step of interpolating the data comprises the step of scaling the data stored for the first color flow image with a piece-wise function that includes a first segment with a substantially unity value, a second segment with a substantially zero value, and a third segment that varies smoothly between the first and second segments.

3. The method of claim 2, further comprising the step of adjusting the length of the first, second, and third segments of the piece-wise function to produce the one or more interpolated images displayed between the first and second color flow images based on the number of vertical sync signals that occur between the time when the data for the first and second color flow images are produced.

4. The method of claim 1, wherein the step of interpolating the data stored for the first and second color flow image to produce the one or more interpolated images further comprises the steps of:
   creating a fixed number of interpolated images based on an assumed number of vertical sync signals to occur between the time when the data for the first and second color flow images are produced; and
   repeating the display of one or more of the interpolated images, if the number of vertical sync signals occurring between the time when the data for the first and second color flow images are produced exceeds the assumed number.

5. The method of claim 1, wherein the step of interpolating the data stored for the first and second color flow image to produce the one or more interpolated images further comprises the steps of:
   creating a fixed number of interpolated images based on an assumed number of vertical sync signals to occur between the time when the data for the first and second color flow images are produced; and
   omitting the display of one or more of the interpolated images, if the number of vertical sync signals occurring between the time when the data for the first and second color flow images are produced is less than the assumed number.

6. The method of claim 1, wherein the data required to produce the color flow images comprises gray scale data, velocity data, power data and variance data, the method further comprising the steps of:
   compressing the velocity, power and variance data produced by the receiver; and
   using the gray scale data and the compressed velocity, power and variance data to produce the one or more interpolated images.

7. The method of claim 6, wherein the step of compressing the velocity, power and variance data produced by the receiver further comprises the step of:
   producing a flow word that is a combination of the velocity, power, and variance data, and a threshold word that is a combination of the velocity, power, and variance data.

8. An ultrasound imaging system for producing color flow images of a tissue sample, comprising:
   a monitor on which the color flow images are displayed at a vertical sync rate;
   a transmitter that produces ultrasonic driving signals;
   a transducer coupled to the transmitter that converts the ultrasonic driving signals into ultrasonic sound waves that are directed into the tissue sample and creates ultrasonic echo signals from echoes produced by the tissue;
   a receiver coupled to the transducer that receives the ultrasonic echo signals and produces data used to display a first and a second color flow image;
   a memory coupled to the receiver that stores the data used to display at least the first and second color flow image; and
   an image processing circuit that reads the data stored for the first and second color flow images and produces one or more interpolated images that are displayed on the monitor between the first and second color flow images wherein the number of interpolated images displayed is dependent on a number of vertical sync signals that occur between the time when the data for the first and second color flow images are produced.

9. The ultrasound system of claim 8, wherein said image processor interpolates the data with a piece-wise function comprising:

a first segment having a substantially unity value, a second segment having a substantially zero value, and a third segment that varies smoothly between the first and second segments.

10. The ultrasound system of claim 8, wherein the data produced by the receiver comprises gray scale data, velocity data, power data, and variance data and wherein said data stored in the memory comprises the gray scale data, a flow word that is a combination of the velocity, power, and variance data, and a threshold word that is a combination of the velocity, power, and variance data.

11. A method of displaying color flow images in an ultrasound system, comprising the steps of:

generating one or more driving signals;

supplying the driving signals to a transducer that converts the driving signals into ultrasonic waves;

directing the ultrasonic waves into a tissue sample under examination;

detecting ultrasonic echoes reflected from the tissue sample, converting the ultrasonic echoes to received ultrasonic signals, and supplying the received ultrasonic signals to a receiver that produces gray scale data, velocity data, power data and variance data required to produce a color flow image;

compressing the velocity, power and variance data produced by the receiver;

storing the gray scale data and the compressed velocity, power and variance data required to produce at least a first and a second color flow image in a memory circuit;

interpolating the gray scale data and the compressed data stored for the first and second color flow image to produce one or more interpolated images; and displaying the first and second color flow images and a number of the one or more interpolated images between the first and second color flow images.

12. The method of claim 11, wherein the step of compressing the velocity, power and variance data produced by the receiver comprises the step of:

producing a flow word that is a combination of the velocity, power, and variance data, and a threshold word that is a combination of the velocity, power, and variance data.

13. The method of claim 11, wherein the step of interpolating the gray scale and compressed velocity, power and variance data comprises the step of scaling the gray scale data and the compressed velocity, power and variance data stored for the first and second color flow images with a piece-wise function that includes a first segment with a substantially unity value, a second segment with a substantially zero value, and a third segment that varies smoothly between the first and second segments.

14. The method of claim 13, wherein the color flow images and the interpolated images are displayed at a vertical sync rate of the ultrasound system, and wherein the step of interpolating the gray scale data and the compressed velocity, power and variance data stored for the first and second color flow images to produce the one or more interpolated images further comprises the steps of:

adjusting the length of the first, second, and third segments of the piece-wise function based on the number of vertical sync signals that occur between the time when the data for the first and second color flow images are produced in order to vary the number of interpolated images displayed between the first and second color flow images.

15. The method of claim 11, wherein the color flow images and interpolated images are displayed at a vertical sync rate of the ultrasound system, and wherein the step of interpolating the data stored for the first and second color flow images to produce the one or more interpolated images further comprises the steps of:

creating a fixed number of interpolated images based on an assumed number of vertical sync signals to occur between the time when the data for the first and second color flow images are produced;

determining a number of sync signals that occur between the time when the data for the first and second color flow images are produced; and repeating the display of one or more of the interpolated images, the number of vertical sync signals occurring between the time when the data for the first and second color flow images are produced exceeds the assumed number.

16. The method of claim 11, wherein the color flow images and interpolated images are displayed at a vertical sync rate of the ultrasound system and wherein the step of interpolating the data stored for the first and second color flow image to produce the one or more interpolated images further comprises the steps of:

creating a fixed number of interpolated images based on an assumed number of vertical sync signals to occur between the time when the data for the first and second color flow images are produced; and determining a number of sync signals that occur between the time when the data for the first and second color flow images are produced;

omitting the display of one or more of the interpolated images, if the number of vertical sync signals occurring between the time when the data for the first and second color flow images are produced is less than the assumed number.

17. A method of displaying color flow images in an ultrasound system, comprising the steps of:

generating one or more driving signals;

supplying the driving signals to a transducer that converts the driving signals into ultrasonic waves;

directing the ultrasonic waves into a tissue sample under examination;

detecting ultrasonic echoes reflected from the tissue sample, converting the ultrasonic echoes to received ultrasonic signals, and supplying the received ultrasonic signals to a receiver that produces data required to produce a color flow image;

storing the data required to produce at least a first and a second color flow image in a memory circuit;

interpolating the data stored for the first and second color flow image to produce one or more interpolated images by scaling the data stored for the first and second color flow images with a pair of piece-wise functions that include a first segment having a substantially unity value, a second segment having a substantially zero value and a third segment that varies smoothly between the first and second segments; and displaying the first and second color flow images and a number of the one or more interpolated images between the first and second color flow images.

18. The method of claim 17, wherein the color flow images and the interpolated images are displayed at a vertical sync rate of the ultrasound system, the method further comprising the steps of:

determining a number of vertical sync signals that occur between the time when the data for the first and second color flow images is produced; and adjusting the length of the first, second and third segments of the piece-wise function based on the number of vertical sync signals that occur between the time when the data for the first and second color flow images is produced in order to vary the number of interpolated color flow images displayed between the first and second color flow images.

19. The method of claim 17, wherein the color flow images and interpolated images are displayed at a vertical sync rate of the ultrasound system, and wherein the step of interpolating the data stored for the first and second color flow images to produce the one or more interpolated images further comprises the steps of:

creating a fixed number of interpolated images based on an assumed number of vertical sync signals to occur between the time when the data for the first and second color flow images are produced;

determining a number of vertical sync signals that occur between the time when the data for the first and second color flow images is produced; and repeating the display of one or more of the interpolated images, if the number of vertical sync signals occurring between the time when the data for the first and second color flow images are produced exceeds the assumed number.

20. The method of claim 17, wherein the color flow images and interpolated images are displayed at a vertical sync rate of the ultrasound system and wherein the step of interpolating the data stored for the first and second color flow images to produce the one or more interpolated images further comprises the steps of:

creating a fixed number of interpolated images based on an assumed number of vertical sync signals to occur between the time when the data for the first and second color flow images are produced;

determining a number of vertical sync signals that occur between the time when the data for the first and second color flow images is produced; and omitting the display of one or more of the interpolated images, if the number of vertical sync signal occurring between the time when the data for the first and second color flow images are produced is less than the assumed number.

21. The method of claim 17, wherein the data to produce the first and second color flow images comprises gray scale data, velocity data, power data and variance data, the method further comprising the steps of:

compressing the velocity, power and variance data produced by the receiver; and using the gray scale data and the compressed velocity, power and variance data to produce the one or more interpolated images.

22. The method of claim 21, wherein the step of compressing the velocity, power and variance data produced by the receiver further comprises the step of:

producing a flow word that is a combination of the velocity, power, and variance data, and a threshold word that is a combination of the velocity, power, and variance data.

* * * * *